United States Patent [19]

Davis

[11] Patent Number: 5,037,700

[45] Date of Patent: Aug. 6, 1991

[54] FLEXIBLE LAMINATES

[75] Inventor: Irwin J. Davis, Bridgewater, N.J.

[73] Assignee: National Starch and Chemical Investment Holding Corporation, Wilmington, Del.

[21] Appl. No.: 225,916

[22] Filed: Jan. 19, 1981

[51] Int. Cl.$^5$ .................. B32B 27/38; B05D 3/02; C08K 3/20

[52] U.S. Cl. ................... 428/414; 156/326; 156/330; 427/207.1; 427/386; 523/409; 523/411; 523/412; 524/501

[58] Field of Search .............. 156/326, 330; 427/207.1, 386; 523/409, 411, 412; 524/501, 502; 428/414

[56] References Cited

U.S. PATENT DOCUMENTS

| | | | |
|---|---|---|---|
| 2,784,128 | 3/1957 | Schroeder | 523/409 |
| 2,798,861 | 7/1957 | Segall | 525/119 |
| 3,107,226 | 10/1963 | Tonner et al. | 525/199 |
| 3,578,548 | 5/1971 | Wesp | 156/78 |
| 3,833,458 | 9/1974 | Bierman et al. | 156/332 |
| 3,905,931 | 9/1975 | Ziegert | 260/29.6 ME |
| 3,945,963 | 3/1976 | Levine et al. | 523/412 |
| 4,042,645 | 8/1977 | Hirota et al. | 525/119 |
| 4,126,596 | 11/1978 | Schimmel et al. | 428/463 |
| 4,228,049 | 10/1980 | Sekmakas et al. | 523/406 |
| 4,247,439 | 1/1981 | Matthews et al. | 523/412 |
| 4,377,433 | 3/1983 | Merz et al. | 156/326 |

FOREIGN PATENT DOCUMENTS

| | | | |
|---|---|---|---|
| 0016247 | 10/1980 | European Pat. Off. | 260/29.6 |
| 0093453 | 9/1974 | Japan | 523/409 |
| 0976963 | 12/1964 | United Kingdom | 523/411 |

*Primary Examiner*—Thurman Page
*Attorney, Agent, or Firm*—Edwin M. Szala; Ellen T. Dec

[57] ABSTRACT

Flexible laminates are prepared using a room temperature curable, water-borne laminating adhesive. The adhesive consists essentially of a copolymer emulsion of an alkyl acrylate, alkyl methacrylate, styrene or vinyl ester, or mixtures thereof, and an ethylenically unsaturated carboxylic acid, and optional selected comonomers, combined with an epoxy resin emulsion and a polyfunctional amine. The flexible laminates are characterized by rapid room temperature curing, high bond strength, superior heat resistance and chemical and water resistance.

28 Claims, No Drawings

FLEXIBLE LAMINATES

BACKGROUND OF THE INVENTION

I. Field of the Invention

The present invention relates to a process for the preparation of flexible laminates and to the laminates formed thereby. In accordance with the process of this invention, the laminate is formed from two or more flexible laminae which are bonded to each other using a room temperature curable, water-borne laminating adhesive. Said laminating adhesive is in emulsion form and consists essentially of a copolymer emulsion of alkyl acrylate, alkyl methacrylate, styrene or vinyl ester, or mixtures thereof, an ethylenically unsaturated carboxylic acid., and optional selected comonomer(s), the copolymer combined with an epoxy resin emulsion and a polyfunctional amine. On removal of the aqueous medium and solvent, if any, the adhesive will rapidly cure at room temperature by chemical reaction to form a laminate having high bond strength, superior heat resistance, and both chemical and water resistance.

The laminates of the invention include those made with laminae of woven and nonwoven fabrics where the fabric itself is of cotton, polyolefin, polyester, nylon, etc.; coated and uncoated paper and paperboard; films such, for example, as polyvinylidene chloride (PVDC), polyester, PVDC coated polyester, oriented and non-oriented polyethylene and polypropylene film; metallic foils and metallized films; and flexible cellular material such, for example, as polyurethane foam or sponge rubber. The laminates of the invention can be made of similar or dissimilar laminae and are useful in a wide variety of end-use applications including for example, flexible packaging, graphic arts and industrial uses such, for example, as weather-stripping and electrical insulation.

II. Brief Description of the Prior Art

The packaging industry, particularly the food packaging area thereof, is currently utilizing large quantities of flexible film laminates. Since all the properties desired in such laminates are not available in any one specific film, the industry generally employs laminates prepared from a combination of films. Very often these laminates are formed from a film of polyethylene terephthalate (PET), polyamide or cellophane, either uncoated or coated with PVDC, laminated to a heat sealable polyolefin film which has been treated by corona discharge for adhesion promotion.

In forming such laminates, an adhesive is first coated onto one of the film surfaces. The coated film is then heated to remove any volatiles from the adhesive and thereafter heat combined between laminating rolls to the other film. In view of the process requirements wherein it is not desirable to employ an adhesive which cures in the oven or during heat combining, it is necessary to employ an adhesive which will cure at room temperature after the laminate has been formed. Moreover, the resulting laminate must develop a strong cured bond which is resistant to inherent delaminating stresses due to differences in modulus of the laminae as well as to the added stresses imposed in end-use service on exposure to heat, cold, humidity, etc.

Heretofore, the most satisfactory laminates, as indicated by industry acceptance, have been formed using urethane or polyester-based adhesives. Most of these adhesives, however, have the disadvantage of requiring organic solvents such as methyl ethyl ketone, ethyl acetate or alcohol in order to form an applicable solution. Due to the desirability of eliminating solvents from such adhesives because of their increasing cost, flammability as well as pollution considerations, the development of an aqueous emulsion adhesive system capable of performing comparably to the solvented adhesives becomes vital to the continued growth of the industry.

In U.S. Pat. No. 3,905,931, an attempt has been made to provide such an adhesive using an aqueous emulsion of a polyethyl acrylate, an ethylene-acrylic acid copolymer and a 1,2-epoxy resin. The resulting laminates formed using these adhesives are, however, very slow to cure at room temperature and do not develop the adhesion and heat resistance required under the conditions to which the laminates are often exposed. As a consequence, delamination may occur resulting in the formation of blisters or tunnels in the package or in the complete separation of the two films. Moreover, these adhesives are not commercially acceptable for use in laminates which are to be formed into a flexible pouch useful as "boilable bags" since they lack resistance to boiling water for the extended cooking periods involved.

It is therefore an object of the present invention to provide a process for the preparation of flexible laminates using a specified aqueous emulsion, room temperature curing adhesive. It is a further object to provide a process which will result in a laminate useful in flexible film packaging applications, in graphic arts and industrial applications, with said laminate characterized by superior bond strength, resistance to temperature extremes and chemical and water resistance. It is also an object of the invention, in its preferred form, to provide a process for forming film laminates which are capable of being formed into flexible food packages. These and other objects will be apparent from the description of the invention which follows.

SUMMARY OF THE INVENTION

The laminates of the present invention may use as laminae a wide variety of flexible materials. Thus suitable laminae include films of polyethylene and polypropylene generally treated for adhesion promotion; also, polyester such as polyethylene terephthalate, cellophane and polyamide which may or may not be coated with PVDC for improved barrier properties. Preferably, dissimilar laminae are used where films, for example, of corona treated polypropylene or polyethylene are bonded to polyester, polyamide or PVDC coated cellophane or PVDC coated polyester, or paper. Also contemplated within the present invention are laminates prepared with woven and non-woven fabrics where the fibers are of cotton, polyesters, polyolefins, polyamide, polyimide and the like; metallic foils auch as aluminum foil; metallized films; paper and paperboard; and cellular flexible sheet materials such as polyethylene foam, polyurethane foam and sponge and foam rubber.

The aqueous emulsion adhesive useful in bonding the laminae comprises a mixture of:

(A) an addition copolymer in emulsion form consisting essentially of, on a solid basis, at least about 60% by weight of an alkyl acrylate, alkyl methacrylate, styrene or vinyl ester of a saturated monocarboxylic acid having 2 to 10 carbon atoms, or mixtures thereof, 1-10% by weight of an $\alpha,\beta$-mono-ethylenically unsaturated carboxylic acid, from 0 to about 39% by weight of a copolymerizable comonomer selected from the group consisting of hydroxy alkyl acrylates, hydroxy alkyl methacrylates, β-methyl styrene, vinyl methyl ether, vinyl ethyl ether and monomers of the group

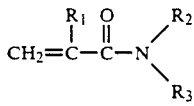

wherein $R_1$ is H or -CH$_3$, $R_2$ and $R_3$ are H, alkyl (1-18C), -CH$_2$OH, or -CH$_2$O-alkyl (1-18C), and from 0 to about 15% by weight of a copolymerizable comonomer selected from the group consisting of acrylonitrile, methacrylonitrile, allyl carbamate and alkylolated allyl carbamate, said copolymer having a $T_g$ of +20° to -50° C., (B) an epoxy resin aqueous emulsion, the solids of part (B) being present in an amount of about 5-50% by weight of the solids of part (A), and (C) a polyfunctional amine containing active hydrogen as a primary or secondary substituent present in an amount to provide 25-125% of the stoichiometric amount of amine based on total epoxy functionality, said amine reacting with said epoxy to effect curing thereof.

In forming the laminating adhesive, components (A) and (B) are combined and, prior to use, there is added thereto a polyfunctional amine which will effect curing of the adhesive. Ordinarily, the amine is diluted with water or water miscible solvent or mixtures thereof and added in solution form. Thus the copolymer of Part (A), prepared in emulsion form, is combined with epoxy resin aqueous emulsion of part (B). The resultant mixture may be stored indefinitely and the amine or amine solution is added only at the time the laminate is to be formed.

In forming the laminate of the present invention, conventional techniques known per se are employed to apply the adhesive emulsion to the film substrate. Thus, these adhesives may be applied by use of any mechanical coating process such as air knife, trailing blade, knife coater, reverse roll or gravure coating technique. Subsequent to its application, the adhesive coated film is then ordinarily passed through an oven to remove substantially all the water and solvent, if any, and then pressure combined (roller nipped) at a temperature from about 25° to 150° C. to form a bond with, for example, a corona treated polyethylene or polypropylene film, or other lamina.

The resultant laminate is characterized by the immediate formation of a strong bond followed by cure during an approximate 72 hour period for development of further strength and heat, chemical and water resistance as required for use as a flexible food package or other end-use.

DETAILED DESCRIPTION OF THE PREFERRED EMBODIMENT

The adhesive of the present invention comprises a copolymer in emulsion form having a $T_g$ within the range of +20° to -50° C. and consists essentially of at least 60% by weight of an alkyl acrylate, alkyl methacrylate, styrene or vinyl ester or mixtures thereof, 1-10% by weight of an α, β-monoethylenically unsaturated carboxylic acid and the remainder of the copolymer comprises optional copolymerizable monomer(s). Preferable adhesives herein will contain emulsion copolymers containing at least about 75% by weight of an alkyl acrylate, alkyl methacrylate, styrene or vinyl ester or mixtures thereof.

More specifically, when alkyl acrylate esters are used in preparing the copolymers of the present invention they may contain from 1-18 carbon atoms in the alkyl group and they are preferably those containing an alkyl group of from 1 to 8 carbon atoms, e.g., ethyl, methyl, propyl, butyl, hexyl, heptyl, octyl, isooctyl, 2-ethylhexylacrylate or mixtures thereof. Thus, while alkyl acrylates such as nonyl, decyl, dodecyl etc. may be used, it is preferred that the copolymer be prepared from alkyl acrylates having an average of from 1 to 8 carbon atoms in the alkyl group. Alternatively, alkyl methacrylates, particularly those containing 1 to 8 carbon atoms in the alkyl group, may also be used to provide all or part of the "acrylate functionality" in the copolymer so long as the particular methacrylate or combination of acrylate and methacrylate monomers are chosen to produce a copolymer having a $T_g$ within the required $T_g$ range. Where a pressure sensitive adhesive is required, the selection of the comonomers can favor the relatively softer acrylate monomers. It has also been found that a portion of the addition copolymer of part A may comprise styrene or a vinyl ester of a linear or branched chain saturated monocarboxylic acid having from 2 to 10 carbon atoms. Useful vinyl esters include, for example, vinyl acetate, vinyl propionate, vinyl butyrate and vinyl versatate. It will be recognized by those skilled in the art that not all vinyl esters will be compatible with the particular acrylate or methacrylate monomer which may also be present, nor will all proportions produce copolymers with the required T range. The practitioner will therefore be left to choose the particular monomer components as well as their relative proportions in order to achieve a copolymer having a $T_g$ appropriate to the desired end use and within the +20° to -50° C. range.

A further required component of the copolymer is at least one α, β-monoethylenically unsaturated carboxylic acid including, for example, acrylic acid, methacrylic acid, crotonic acid, maleic acid, maleic anhydride, itaconic acid, itaconic anhydride, fumaric acid, half esters or half amides of maleic, fumaric and itaconic acid, etc. It will be recognized that not all acids will copolymerize with all alkyl acrylates, methacrylates or vinyl esters, however, the choice of the proper components will be readily apparent to those skilled in the art. For purposes of this invention, the designated anhydrides are functionally equivalent to the required carboxylic acid monomers.

The optional copolymerizable comonomers which may be present in the adhesive compositions include one or more other addition copolymerizable monomers which contain an ethylenically unsaturated linkage. Useful optional comonomers which will copolymerize by addition reaction and which can be employed have already been defined in the summary of the invention. The choice of the particular components of the copolymer will be determined, in part, by the properties required in the laminate and the end use thereof. Thus, in the case of film laminates to be used in the food packaging industry, it will be necessary to choose copolymer components which meet the requirements set forth by the Food and Drug Administration for the intended use.

It will be recognized that in forming the copolymer, mixtures of the various components may be used and the optional copolymerizable comonomer can actually be one or more comonomers. The final copolymer must, however, have a $T_g$ within the range of +20° to -50° C., and preferably from 0° to -40° C. and a weight average molecular weight of between about 50,000 and 2,000,000, preferably 100,000 to 1,000,000. The solids content will range from about 20% to 65% by weight. Copolymer emulsions having a solids content of about 50% by weight are preferred.

The preferred adhesives, particularly with regard to obtaining adhesive bond strength, are prepared using copolymers wherein the major portion (at least about 75%) is comprised of n- or isobutyl acrylate, ethyl α,β-acrylate or mixtures thereof. Moreover, particularly preferred compositions are those prepared using copolymers comprising at least about 75% ethyl or butyl acrylate and 2–4% acrylic acid, with the remainder of the composition comprising other defined copolymerizable comonomers.

The copolymer may be formed using any of the known emulsion polymerization procedures. Thus, the monomers may be emulsified with an anionic, cationic or a nonionic dispersing agent, about 0.05 to 10% thereof ordinarily being used on the weight of the total monomers. Suitable dispersing agents include anionic types, for example, the sodium salts of the higher fatty acid sulfates or the higher fatty acid salts of morpholine, triethanolamine or mixed ethanolamines or any of the nonionic types such as ethylene oxide-modified alkyl phenols, ethylene oxide-modified higher fatty alcohols, modified long chain mercaptans, fatty acids, amines or the like. Mixtures of nonionic and anionic dispersing agents are also useful. The preferred composition is prepared with a nonionic emulsifier or such emulsifier is added after polymerization. The acid comonomer and many of the other functional or polar comonomers employed may be soluble in water so that they may aid the dispersing agent which serves to emulsify the other comonomer or comonomers.

A polymerization initiator of the free-radical type, such as ammonium or potassium persulfate, may be used alone or in conjunction with an accelerator, such as potassium metabisulfite or sodium thiosulfate. Organic peroxides, such as benzoyl peroxide and t-butyl hydroperoxide, are also useful initiators. The initiator and accelerator may be used in proportions of 0.1–10% based on the weight of monomers to be copolymerized. The amount may be adjusted to control the molecular weight of the polymer as is known to the skilled practitioner. The polymerization temperature employed may range from room temperature to above 75° C. as is conventional.

The polymerization process for preparing the copolymer can be carried out batchwise or continuously. It is possible to work entirely batchwise, emulsifying the entire charge of monomers and proceeding with polymerization. It is usually advantageous, however, to start with part of the monomers which are to be used and add more monomer(s) as polymerization proceeds.

Suitable epoxy resins for use herein as the second component of the adhesive composition include reaction products of bisphenol A or bisphenol F and epichlorohydrin, epoxidized novolac resins formed by reaction of epichlorohydrin with the resinous reaction product of phenol (or substituted phenols) and formaldehyde, resinous reaction products formed from epichlorohydrin and an aliphatic polyol such as glycerol, 1,4-butanediol, poly(oxypropylene) glycol or similar polyalcoholic components, and resins obtained by epoxidation with peracetic acid. A particularly preferred epoxy resin is the 4,4'-isopropylidenediphenol/epichlorohydrin reaction product, one of the bisphenol A-epichlorohydrin type materials, which is available commercially under the tradename Epon 828 (Shell Chemical). These epoxy resins are either available in liquid or solid form and may be readily emulsified with water at a concentration of about 40 to 75% solids by weight for use herein.

The epoxy resin emulsion is combined with the copolymer in an amount of about 5–50% on a solids basis of the dry weight of the copolymer. Preferred compositions contain the epoxy resin in an amount of 10–30% on a solids basis of the dry weight of the copolymer.

After the epoxy resin and the copolymer emulsion are combined, this mixture can be stored indefinitely. When formation of the laminate is desired, the mixture is then combined with a polyfunctional amine in an amount such that there is present a stoichiometric or slightly more or less than stoichiometric amount of amine based on total epoxy functionality. Amounts exceeding the stoichiometric amount by about 25% may be used, and while amounts as little as about 25% of stoichiometric can be employed, the use of amounts less than about 50% will result in a lower performance product having a narrower range of enduse applications. Conversely, one may wish to employ an amine concentration which is greater than 125% of stoichiometric on a particular end-use. Virtually any polyfunctional amine containing active hydrogens as a primary or secondary substituent may be employed although water soluble amines are preferred. The most preferred amines are ethylene diamine, diethylene triamine, triethylene tetramine, isophorone diamine and tetraethylene pentamine; however, other amines such as propylene diamine, butylene diamine and hexamethylene diamine may also be used. If a polyfunctionalamine is used which is not water soluble, organic solvents may be employed or emulsifiers may be used to produce an aqueous dispersion which will be compatible with the other adhesive components.

It will be recognized by one skilled in the art that the epoxy resin or polyfunctional amine component may, if desired, be added directly in the form of a 100% solids so as to produce the resin emulsion or amine solution in situ.

In addition to the three necessary components described above, additives which are conventionally used in laminating adhesives may also be included. Such additives include, for example, defoamers (preferably nonsilicone types), leveling and wetting aids, humectants, etc. Depending in part on the surface properties of the substrates to be coated, (e.g. in the case of a polyolefin where the degree of corona treatment is less than that required to produce a charge corresponding to a surface tension of about 50 dynes/cm of the substrate) it may be desirable to add from 5 to 25% by weight of the composition of a water miscible organic solvent, particularly a lower molecular weight alcohol, e.g. methyl, ethyl, n-propyl, isopropyl, α-butyl, isobutyl or t-butyl alcohol in order to enhance wetting of the polymer film substrate.

In order to use the adhesive in the process of the invention, the combined three components are generally blended with water (and alcohol, if desired) to provide a solids concentration of about 15–40% by weight, the final concentration depending on the method of application and the desired coating weight. The adhesive may then be applied to the substrate using any conventional method including gravure roll coating, reverse roll and rod coating, etc. Most conveniently, the adhesive is applied with a gravure etched cylinder. When such cylinders are employed with the gravure cylinder having a 150 quadrangular screen count, a solids concentration of about 30% by weight is preferred applying 1.25 to 1.5 dry lbs of adhesive/ream. In some laminations, the adhesive may be coated in amounts up to, for example, 20 dry lbs/ream.

It is to be noted that at these solids levels, the viscosities of the laminating adhesives used herein will be less than about 500 cps. Such relatively low viscosities are required for most applications using conventional laminating equipment and techniques. For the few unusual applications which may require higher viscosities (generally less than about 5000 cps.), conventional water-soluble thickeners may be used.

The following examples, in which the parts are by weight and temperatures are in degrees Celsius unless otherwise specified, are illustrative of the present invention.

TEST PROCEDURES

In the Examples below, the following test procedures are used to evaluate the adhesive of the present invention.

Peel Adhesion (bond strength test)

An Instron Testing Unit was run at a rate of 12 inches per minute to pull apart a 1 inch wide strip of the laminate. The force needed is shown in grams. Preferably, the adhesive should cure to "tear", i.e. one of the base films should rupture instead of the films separating or delaminating.

Static Load Test

A one inch wide strip of the laminate is prepared in which no
adhesive is applied to approximately the upper ½ inch. One substrate film is then attached vertically to a heavy cardboard card and a 35 gram weight (including clip) is attached to the other film substrate. The assembly is mounted in an oven at 82° C. for 15 minutes and then removed. The delamination (slippage or creep) caused by the weight is measured in inches. A fully cured, heat resistant bond will show no (0") delamination.

EXAMPLE I

A copolymer emulsion was prepared according to each of the following formulations (the numbers listed against the monomers indicate "parts by weight" used in the polymerization process).

| Monomers | A | B | C* |
|---|---|---|---|
| Ethyl Acrylate | 77.5 | 75 | 80 |
| n-Butyl Acrylate | 10 | 10 | 10 |
| Vinyl Acetate | 10 | 10 | 10 |
| Acrylic Acid | 2.5 | 2.5 | — |
| 2-Hydroxyethyl Acrylate | — | 2.5 | — |
| T$_g$ | −5° C. | −7° C. | −10° C. |
| Solids | 50% | 50% | 50% |

*Formulation C is a comparative copolymer lacking any α,β-monoethylenically unsaturated carboxylic acid.

α, β-monoethylenically unsaturated carboxylic acid.

Additionally, an epoxy resin emulsion was prepared at 60% solids employing 60.0 parts Epon 828, 35.0 parts water, 4.0 parts polyvinyl alcohol (Elvanol 51-01, du Pont) and 1.0 parts of Triton X-100 (Rohm & Haas).

Eighty parts of each of the copolymer emulsions A, B and C were combined with 20 parts of the epoxy resin emulsion to form the adhesive respectively designated A, B and C, to which was added prior to use 10 parts of a 16.5% aqueous solution of tetraethylene pentamine.

The three adhesive formulations were coated on the coated surface of 50 M Mylar (PVDC coated polyester film, 0.5 mil, sold by E. I, du Pont de Nemours), dried to remove the water and hot nipped at 80° C. to the treated side of corona treated 2 mil low density polyethylene. The adhesive was coated at 1.5 lbs./ream. Bond strengths were tested in the manner described above, initially (about 1 hour after formation) and again after ageing for 2 week at room temperature. Testing results are shown below.

| | Bond Strength | | Static Load |
|---|---|---|---|
| Adhesive | Initial | After 1 Week | After 1 Week |
| A | 380 g/in. | 850 g/in. (tear) | 0" delam. |
| B | 350 g/in. | 930 g/in. (tear) | 0" delam. |
| C | 330 g/in. | 550 g/in. | complete delam. |

Films of each of the adhesives were cast on release paper and allowed to cure 1 week at room temperature and thereafter observed as follows.

| Adhesive | Appearance | Soak in Methyl Ethyl Ketone for 24 hours |
|---|---|---|
| A | firm and clear | no effect |
| B | firm and clear | no effect |
| C | milky and weak | swells |

EXAMPLE II

Two adhesives were prepared, designated D and E, employing copolymer emulsions prepared against the monomers indicate "parts by weight" of monomer used in the polymerization process.

| Monomers | D | E |
|---|---|---|
| iso-Butyl Acrylate | 78 | — |
| n-Butyl Acrylate | — | 78 |
| Ethyl Acrylate | 9 | — |
| Vinyl Acetate | 9 | 18 |
| Acrylic Acid | 2.0 | 2.0 |
| N-Methylol Acrylamide | 2.0 | 2.0 |
| T$_g$ | −15° C. | −30° C. |
| Solids | 50% | 50% |

An epoxy resin emulsion was prepared as follows by placing 58.0 parts of Epon 828 in an open vessel equipped with a high speed turbine stirrer. With agitation, 8.2 parts of Alipal EP-120, 30% aqueous solution, (GAF corp.) was added very slowly, then 33.8 parts of water was added very slowly until an emulsion was formed with a particle size of approximately 1.0 micron.

About 77 parts of each copolymer emulsion were combined with 23 parts of the thus prepared epoxy resin emulsion (58% solids). Prior to use, 10 parts of a 26.0% aqueous solution of isophorone diamine was added to the adhesive.

The final adhesive formulations were employed to bond films forming a laminate particularly useful in meat and cheese packaging. The adhesives were coated on films of 2 mil polyamide film, dried and hot nipped (at 50° C.) to corona treated 2 mil low density polyethylene. The adhesive was coated at 1.25 lbs/ream. Bond strengths were tested in the manner described above initially and again after 1 week ageing at room temperature with testing results shown below.

| | Bond Strength | | |
|---|---|---|---|
| Adhesive | Initial | After 1 Week | Static Load After 1 Week |
| D | 300 g/in. | 1700 g/in. (tear) | 0" delam. |
| E | 450 g/in. | 1100 g/in. (tear) | 0" delam. |

The one-week aged laminates were additionally tested for bond strength after conditioning for 72 hours @ 90% RH at 100° F. The laminate prepared using Adhesive D showed a strength of 1000 g/in. (tear) and the laminate prepared using Adhesive E showed a strength of 850 g/in. (tear).

EXAMPLE III

The following adhesive formulation was used in preparing a flexible laminate useful as book cover paper.

The adhesive was prepared by combining 80.0 parts of copolymer E of Ex. II with 11.5 parts of the epoxy resin emulsion employed in Ex. II and 9.5 parts of water. Prior to use, 4.5 parts of a 26.0% solution of isophorone diamine and 10.0 parts of isopropanol were added to the adhesive. The adhesive was applied by reverse roller to 0.5 mil polyester (PET) film at 7.0 lbs/reams, dried and hot nipped (66° C.) to printed paperboard. After allowing the laminate to cure at room temperature for several days, a tearing of the paper was obtained in the peel test and the laminate withstood repeated folding without delamination. The laminate showed no yellowing in

EXAMPLE IV

Additional copolymer emulsions useful in the adhesive of the invention were prepared according to the following formulations.

| Monomers | F | G | H |
|---|---|---|---|
| n-Butyl Acrylate | 10 | 50 | 40 |
| 2-Ethylhexyl Acrylate | 30 | 30 | — |
| Vinyl Acetate | 55 | 15 | 12.5 |
| Acrylic Acid | 2.5 | — | 7.5 |
| Methacrylic acid | — | 5 | — |
| Acrylonitrile | 2.5 | — | — |
| Methyl Methacrylate | — | — | 40 |
| $T_g$ | −17° C. | −45° C. | −13° C. |
| Solids | 50% | 50% | 50% |

Three adhesives were prepared as follows.
1 About 20 parts of the epoxy resin emulsion (58% solids) of Example II was blended with 80 parts of copolymer F. About 10 parts of tetraethylenepentamine (16.5% solids) was stirred into the mixture to produce the adhesive useful for producing laminates used in flexible packaging.
2. About 30 parts of the epoxy resin emulsion of Example II was blended with 70 parts of copolymer G. About 10 parts of diethylenetriamine (18.3% solids) was stirred into the mixture to produce the adhesive. This adhesive was used to combine a heat sensitive urethane foam (1/8 inch thickness) using only roller pressure at 25° C. to 1.0 mil corona treated polyester film. After curing at room temperature for five days, a tearing bond was obtained. The end product was cut into tape form and was useful as weather stripping and a window seal.
3. About 25 parts of the epoxy resin emulsion of Example I (60% solids) was blended with 75 parts of copolymer H. About 4.7 parts of ethylene diamine (100% solids) was stirred into the mixture to produce the adhesive. The adhesive was used to laminate 1.0 mil aluminum foil to rag paper. The adhesive was applied to 3 to 5 lbs/ream and roller nipped at 85° C. After curing for 7 days at room temperature, a tearing bond was obtained.

EXAMPLE V

Additional copolymer emulsions useful in the adhesives of the invention are prepared according to the following formulations.

| Monomers | I | J | K | L |
|---|---|---|---|---|
| n-Butyl Acrylate | — | 66 | — | 65 |
| Ethyl Acrylate | 75 | — | 73 | — |
| Styrene | — | — | — | 30 |
| Vinyl Acetate | — | — | 20 | — |
| Vinyl Propionate | 20 | — | — | — |
| Monoethyl Maleate | 5 | — | — | — |
| Methacrylic Acid | — | 4 | 3 | 5 |
| iso-Octyl Acrylamide | — | 30 | — | — |
| Methylolated Allyl Carbamate | — | — | 4 | — |
| $T_g$ | −14° C. | −22° C. | −3° C. | −17° C. |
| Solids | 50% | 50% | 50% | 50% |

Each of the above copolymers is blended with the epoxy resin emulsion (58% solids) of Example II in a proportion of 77 parts of copolymer emulsion to 23 parts of epoxy emulsion. About 10 parts of isophorone diamine (26.0% aqueous solution) is blended to each mixture to produce the final adhesive which is then used to laminate films of PVDC coated cellophane, PVDC coated polyester and aluminum foil (1 mil) to films of corona treated low density polyethylene. The adhesive is applied at from 3–6 lbs dry/ream and the films are roller nipped at 85° C. After room temperature curing for three days, a tearing bond is obtained with all laminates.

The preferred embodiments of the present invention having been described above, various modifications and improvements thereon will now become readily apparent to those skilled in the art. Accordingly, the spirit and scope of the present invention is defined not by the foregoing disclosure, but only by the appended claims.

What is claimed is:
1. A process for the preparation of a flexible laminate comprising the steps of (a) coating a surface of a first lamina with a room temperature curable laminating adhesive, (b) heating said coated lamina to remove water and any solvent, (c) superimposing a second lamina over the coated surface of the first lamina and roller nipping the laminae at a temperature of from about 25° to 150° C., thereby bonding said first and second laminae and forming a flexible laminate, said laminating adhesive being in aqueous emulsion form and comprising,
(A) an addition copolymer in aqueous emulsion form consisting of, on a solid basis, at least about 60% by weight of an alkyl acrylate, alkyl methacrylate, styrene or vinyl ester of a saturated monocarbox- ylic acid having 2 to 10 carbon atoms, or mixtures thereof, 1-10% by weight of an α, β-monoethylenically unsaturated carboxylic acid, from 0 to about 39% by weight of a copolymerizable comonomer selected from the group consisting of hydroxy alkyl acrylates, hydroxy alkyl methacrylates, α-methyl styrene, vinyl methyl ether, vinyl ethyl ether and monomers of the group

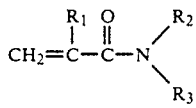

wherein $R_1$ is H or -$CH_3$,
$R_2$ and $R_3$ are H, alkyl (1-18C), -$CH_2OH$, or -$CH_2O$-alkyl (1-18C), and from 0 to about 15% by weight of a copolymerizable comonomer selected from the group consisting of acrylonitrile, methacrylonitrile, allyl carbamate and alkylolated allyl carbamate, said copolymer having a $T_g$ of +20° to -50° C., (B) an epoxy resin aqueous emulsion, the solids of part (B) being present in an amount of about 5-50% by weight of the solids of part (A), and (C) a polyfunctional amine containing active hydrogen as a primary or secondary substituent present in an amount to provide 25-125% of the stoichiometric amount of amine based on total epoxy functionality, said amine reacting with said epoxy to effect curing thereof.

2. The process of claim 1 wherein the addition copolymer of (A) comprises at least about 60% by weight of an alkyl acrylate having from 1 to 8 carbon atoms in the alkyl group.

3. The process of claim 1 wherein the addition copolymer of (A) comprises at least about 75% by weight of ethyl acrylate or butyl acrylate and 2 to 4% by weight of acrylic acid, said copolymer having a $T_g$ of from 0° C. to -40° C.

4. The process of claim 1 wherein the addition copolymer of (A) comprises at least about 60% by weight of a vinyl ester selected from vinyl acetate or vinyl propionate.

5. The process of claim 1 wherein the α, β-monoethylenically unsaturated carboxylic acid present in the addition copolymer of (A) is selected from the group consisting of acrylic acid, methacrylic acid, crotonic acid, maleic acid, maleic anhydride, itaconic acid, itaconic anhydride, fumaric acid and the half esters or half amides of maleic, fumaric and itaconic acid.

6. The process of claim 1 wherein the epoxy resin of (B) is selected from the group consisting of reaction products of bisphenol A and epichlorohydrin, bisphenol F and epichlorohydrin, epoxidized novolac resins, resinous reaction products formed by reaction of epichlorohydrin and an aliphatic polyol, and resins obtained by epoxidation with peracetic acid.

7. The process of claim 1 wherein the epoxy resin of (B) is present in an amount of 10-30% solids by weight of the copolymer of part (A).

8. The process of claim 1 wherein the polyfunctional amine of (C) is selected from the group consisting of ethylene diamine, diethylene triamine, isophorone diamine, triethylene tetramine, and tetraethylene pentamine.

9. The process of claim 1 wherein the polyfunctional amine is present in an amount sufficient to provide at least 50% of the stoichiometric amount of amine based on total epoxy functionality.

10. The process of claim 1 wherein there is additionally present in the laminating adhesive from 5 to 25% by weight of the composition of a lower molecular weight alcohol.

11. The laminate produced by the process of claim 1.
12. The laminate produced by the process of claim 2.
13. The laminate produced by the process of claim 3.
14. The laminate produced by the process of claim 4.

15. A laminating adhesive in aqueous emulsion from comprising:

(A) an addition copolymer in aqueous emulsion form consisting of, on a solids basis,
  (a) at least about 60% by weight of an alkyl acrylate, alkyl methacrylate, styrene or vinyl ester of a saturated monocarboxylic acid having 2 to 10 carbon atoms, or mixtures thereof,
  (b) 1-10% by weight of an α, β-monoethylenically unsaturated carboxylic acid,
  (c) 0 to 39% by weight of a copolymerizable comonomer selected from the group consisting of hydroxy alkyl acrylates, hydroxy alkyl methacrylates, α-methyl styrene, vinyl methyl ether, vinyl ethyl ether and monomers of the group

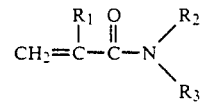

wherein $R_1$ is H or -$CH_3$, $R_2$ and $R_3$ are H, alkyl (1-18C), -$CH_2OH$ or -$CH_2O$-alkyl (1-18C) and
  (d) from 0 to about 15% by weight of a copolymerizable comonomer selected from the group consisting of acrylonitrile, methacrylonitrile, allyl carbamate and alkylolated allyl carbamate, said copolymer having a Tg of +20° to -50° C., (B) an epoxy resin aqueous emulsion, the solids of part B being present in an amount of about 5-50% by weight of the solids of part A, and (C) a polyfunctional amine containing active hydrogen as a primary or secondary substituent present in an amount to provide 25-125% of the stoichiometric amount of amine based on total epoxy functionality, said amine reacting with said epoxy to effect curing thereof.

16. The laminating adhesive of claim 15 containing conventional adhesive additives comprising defoamers, leveling and wetting aids, humectants, water-soluble thickeners and water miscible organic solvents.

17. The laminating adhesive of claim 15 wherein said copolymerizable comonomer of (c) is selected from monomers of the group

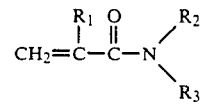

wherein $R_1$ is H or -$CH_3$, $R_2$ and $R_3$ are H, alkyl (1-18C), -$CH_2OH$ or -$CH_2O$-alkyl (1-18C).

18. The laminating adhesive of claim 15 wherein the epoxy resin of (B) is present in an amount of from 10 to 30% solids by weight of the solids of part (A).

19. A process for the production of the laminating adhesive of claim 15 consisting of:

(1) mixing from 5 to 50% solids by weight, based on the copolymer dry weight, of said epoxy compound with an aqueous emulsion of the copolymer of (A) after completion of polymerization (2) mixing with (A) and said epoxy compound said polyfunctional amine in an amount to provide 25-125% of the stoichiometric amount of amine based on total epoxy functionality, and (3) recovering said laminating adhesive.

20. In the process for the preparation of flexible laminates comprising applying an aqueous laminating adhesive to a solid substrate selected from the group consisting of paper, paperboard, metallic foils and metallized films, drying and recovering said solid substrate coated with an adhesive coating, the improvement consisting essentially of employing a laminating adhesive in aqueous emulsion form comprising:

(A) an addition copolymer in aqueous emulsion from consisting of, on a solids basis, (a) at least about 60% by weight of an alkyl acrylate, alkyl methacrylate, styrene or vinyl ester of a saturated monocarboxylic acid having 2 to 10 carbon atoms, or mixtures thereof, (b) 1-10% by weight of an $\alpha$, $\beta$-monoethylenically unsaturated carboxylic acid, (c) 0 to 395 by weight of a copolymerizable comonomer selected from the group consisting of hydroxy alkyl acrylates, hydroxy alkyl methacrylates, $\alpha$-methyl styrene, vinyl methyl ether, vinyl ethyl ether and monomers of the group

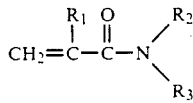

wherein $R_1$ is H or -CH$_3$, $R_2$ and $R_3$ are H, alkyl (1 -18C), -CH$_2$Oh or -CH$_2$O-alkyl (1-18C) and (d) from 0 to about 15% by weight of a copolymerizable comonomer selected from the group consisting of acrylonitrile, methacrylonitrile, allyl carbamate and alkylolated allyl carbamate, said copolymer having a Tg of +20° to −50° C., (B) an epoxy resin aqueous emulsion, the solids of part B being present in an amount of about 5-50% by weight of the solids of part A, and (C) a polyfunctional amine containing active hydrogen as a primary or secondary substitutent present in an amount to provide 25-125% of the stoichiometric amount of amine based on total epoxy functionality, said amine reacting with said epoxy to effect curing thereof, said laminating adhesive being capable of laminating at temperatures of between 25° and 150° C.

21. The process of claim 20 wherein said solid substrate coated with an adhesive coating is laminated with a sheetlike structure.

22. The process of claim 21 wherein said sheeting structure is selected from the group consisting of polyolefin, polyester, polyamide, polyimide, polyethylene foam, and polyurethane foam.

23. The process of claim 21 wherein said solid substrate is selected from the group consisting of paper, paperboard and aluminum foil and said sheetlike structure is selected from the group consisting of polyolefin, polyester, polyamide, polyimide, polyethylene foam, and polyurethane foam.

24. The laminating adhesive of claim 15 wherein said $\alpha$, $\beta$-monoethylenically unsaturated carboxylic acid present in the addition copolymer of (A) is selected from the group consisting of acrylic acid, methacrylic acid, crotonic acid, maleic acid, maleic anhydride, itaconic acid, itaconic anhydride, fumaric acid and the half esters or half amides of maleic, fumaric and itaconic acid.

25. The laminating adhesive of claim 15 wherein said other copolymerizable comonomers of component (A)(c) is selected from the group consisting of hydroxyethyl acrylate, hydroxyethyl methacrylate and hydroxypropyl methacrylate.

26. The laminating adhesive of claim 17 wherein said epoxy compound of component (B) is used at a concentration of about 40 to 75% solids.

27. The process of claim 21 wherein said solid substrate coated with an adhesive coating is a sheetlike structure.

28. The process of claim 21 wherein said sheetlike structure and said solid substrate of claim 21 which are laminated are foils and the laminated foils are resistant to sterilization.

* * * * *